United States Patent
Kubrak et al.

(10) Patent No.: US 8,472,504 B2
(45) Date of Patent: Jun. 25, 2013

(54) METHOD FOR OPTIMIZING AN ACQUISITION OF A SPREAD-SPECTRUM SIGNAL FROM A SATELLITE BY A MOBILE RECEIVER

(75) Inventors: Damien Kubrak, Ville (FR); Michel Monnerat, Saint Jean (FR); Lionel Ries, Viviers les Montagnes (FR); Géraldine Artaud, Toulouse (FR)

(73) Assignees: Thales, Neuilly/sur/Seine (FR); Centre National d'Etudes Spatiales, Paris (FR)

( * ) Notice: Subject to any disclaimer, the term of this patent is extended or adjusted under 35 U.S.C. 154(b) by 173 days.

(21) Appl. No.: 13/121,066

(22) PCT Filed: Sep. 25, 2009

(86) PCT No.: PCT/EP2009/062426
§ 371 (c)(1),
(2), (4) Date: Apr. 28, 2011

(87) PCT Pub. No.: WO2010/034800
PCT Pub. Date: Apr. 1, 2010

(65) Prior Publication Data
US 2011/0206090 A1 Aug. 25, 2011

(30) Foreign Application Priority Data
Sep. 26, 2008 (FR) .................................... 08 05320

(51) Int. Cl.
*H04B 1/69* (2011.01)
(52) U.S. Cl.
USPC ........... 375/142; 375/343; 375/150; 375/147; 375/240

(58) Field of Classification Search
USPC .............. 375/142, 147, 150, 343; 342/357.12
See application file for complete search history.

(56) References Cited

U.S. PATENT DOCUMENTS

| 6,111,911 | A | * | 8/2000 | Sanderford et al. | 375/147 |
|---|---|---|---|---|---|
| 6,133,873 | A | | 10/2000 | Krasner | |
| 6,850,557 | B1 | | 2/2005 | Gronemeyer | |
| 2006/0012515 | A1 | | 1/2006 | Park et al. | |
| 2006/0115022 | A1 | | 6/2006 | Ziedan et al. | |
| 2010/0135363 | A1 | * | 6/2010 | Qin et al. | 375/147 |
| 2011/0129002 | A1 | * | 6/2011 | De Latour | 375/150 |
| 2011/0206093 | A1 | * | 8/2011 | Mizuochi et al. | 375/150 |
| 2011/0280348 | A1 | * | 11/2011 | Li et al. | 375/343 |

FOREIGN PATENT DOCUMENTS
WO  99/66649 A  12/1999

OTHER PUBLICATIONS

Elders-Boll, et al.: "Efficient Differentially Coherent Code/Doppler Acquisition of Weak GPS Signals," Spread Spectrum Techniques and Applications, 2004 IEEE Eighth International Symposium on, Sydney, Australia Aug. 30-Sep. 2, 2004, Piscataway, NJ, USA, IEEE, Aug. 30, 2004, pp. 731-735, XP010755130.

* cited by examiner

*Primary Examiner* — Eva Puente
(74) *Attorney, Agent, or Firm* — Baker & Hostetler, LLP

(57) ABSTRACT

A method for optimizing an acquisition phase of a spread-spectrum signal by a mobile receiver includes searching for a trend path having the maximum energy for different frequency assumptions and among all the positive trend paths of frequencies between initial and final instants marking the beginning and the end of a coherent signal integration.

6 Claims, 2 Drawing Sheets

METHOD FOR OPTIMIZING AN ACQUISITION OF A SPREAD-SPECTRUM SIGNAL FROM A SATELLITE BY A MOBILE RECEIVER

CROSS-REFERENCE TO RELATED APPLICATIONS

This application is a National Stage of International patent application PCT/EP2009/062426, filed on Sep. 25, 2009, which claims priority to foreign French patent application No. FR 08 05320, filed on Sep. 26, 2008, the disclosures of which are incorporated by reference in their entirety.

FIELD OF THE INVENTION

The present invention relates to a method for optimizing a process for acquiring a spread-spectrum signal, implemented by a mobile receiver. The invention applies, for example, to any navigation signal originating from a satellite global navigation system of GPS (Global Positioning System), Galileo type.

BACKGROUND OF THE INVENTION

The expression "mobile receiver" will be understood here to mean both the devices (or receivers) exclusively dedicated to satellite positioning, portable or embedded in a land, sea or air vehicle, and the communication terminals equipped with a satellite positioning device, such as, for example, cell phones, or laptop computers or personal digital assistants (PDA), possibly of communicating type.

In a satellite positioning system using GNSS (Global Navigation Satellite System) type receivers, the data signals enabling the receiver to compute its positioning originate from different satellites belonging to a constellation of positioning satellites (at least four to determine four unknowns corresponding to the geographic coordinates x, y, z and time coordinate t of the receiver).

Satellite positioning involves a sequencing of two steps. The first step, called acquisition, consists in determining, on the mobile receiver concerned, the pseudo-random spreading codes which modulate the signals originating from the satellites belonging to the constellation and related to a reference time. The procedure in fact "compares" the signals received from the satellites to replicas of signals generated locally by the receiver and resulting from assumptions concerning the reference time and concerning the pacing frequency of the satellites, in order to deduce therefrom the pseudo-random codes which modulate said received signals or, in other words, to synchronize the pacing clock of the receiver and its frequency on the clock and the frequency of each satellite. For this, a search in time-frequency for the energy of the signal originating from the satellite is performed, this search usually being carried out by correlation measurements based on pairs of time and frequency assumptions in order to determine the maximum correlation between the received signal and the local replica of the receiver.

The second step consists in determining the position of the mobile receiver on the basis of the acquired codes and navigation data notably contained in the received signals. This second step may be more specifically subdivided into three substeps: a substep for determining, from the acquired pseudo-random codes, the propagation times of the signals between each of the satellites and the receiver, a substep for determining, from the navigation data contained in the signals and the propagation times, pseudo-distances between the receiver and each of the satellites, and a substep for determining the position of the receiver from the pseudo-distances. An exemplary satellite positioning system is described in the document US 2006/0115022.

The accuracy of each propagation time, and therefore of each pseudo-distance, directly determines the accuracy of the position. Now, the accuracy of each propagation time depends on the quality of the acquisition of the pseudo-random codes of the corresponding received signal, which is dependent on the quality of said received signal. Consequently, when at least one of the signals received from a satellite is of poor quality, which is relatively commonplace, notably in uneven or crowded environments such as urban areas, the determined position is usually affected by error. It is even possible to be momentarily unable to determine the position of the receiver, even though the signals originating from the other satellites are of good quality.

The receiver has three frequency uncertainties to which is added an unknown concerning the date leading it to perform the search in time and in frequency for the energy originating from a satellite. These three frequency uncertainties are the Doppler effect associated with the mobility of the satellite, the uncertainty linked to the accuracy of the clock of the receiver, and the Doppler effect associated with the mobility of the receiver. The Doppler effect associated with the movement of the satellite can be determined in an known manner by using, for example, an assistance server such as that used in the AGPS (Assisted GPS)-type locating techniques. The local oscillators of the clocks are increasingly efficient and becoming more and more stable. The Doppler effect associated with the movement of the receiver becomes the predominant source of the uncertainties concerning the location of the correlation peak and therefore of the receiver.

Not taking into account the Doppler effect associated with the receiver may have a dramatic effect in the case of the acquisition of low energy signals which require the received signal to be integrated coherently over a long time period. In practice, the width of the frequency assumption integration windows being inversely proportional to the integration time, the longer the coherent integration time, the smaller the width of the frequency assumption integration windows and therefore the greater the number of frequency assumptions. The time and frequency sweeps then involve a computation power and data processing time that are very significant for the receiver and increase the uncertainty concerning the location of the receiver. In a conventional acquisition scheme, as described, for example, in the document US 2006/0012515, the coherent integration is performed generally on a frequency assumption which remains the same throughout the integration time, which presupposes that the actual frequency of the received signal is stable over the integration time. During a long coherent integration, the Doppler associated with the movement of the user causes the actual received frequency to vary during said integration which makes the integration inoperative if it is performed on a stability assumption.

SUMMARY OF THE INVENTION

The aim of the present invention is to remedy this problem by proposing a method for optimizing an acquisition of a navigation signal originating from a satellite by a mobile receiver taking into account the Doppler effect associated with the receiver and making it possible to reduce the number of frequency assumptions to be explored when searching for the correlation peak of the signal and to reduce the computation time within the receiver.

To this end, the subject of the invention is a method for optimizing an acquisition of a spread-spectrum signal originating from a satellite by a mobile receiver, consisting:

in receiving a signal transmitted by at least one transmitter, the signal being modulated by a pseudo-random code,
in generating a local replica of the pseudo-random code of the signal transmitted,
in transmitting a plurality of assumptions relating to the frequency $f_i$ of the signal received at an initial instant $t_0$ and to the trend of this frequency over time up to a final instant $t_n$ corresponding to an integration time, each assumption concerning the trend of the frequency of the signal between the initial instant and the final instant being called trend path,
in calculating the correlation functions $s(f_i, t_k, \tau)$ of all the pairs of frequency-time assumptions $(f_i, t_k)$,
characterized in that it also consists:
in choosing a first initial frequency assumption $f_1$ corresponding to the initial instant $t_0$,
in acquiring at least one information item concerning the movement of the receiver, and deducing therefrom, for the initial frequency assumption the trend assumptions for the frequency of the signal over time,
in determining the respective total energy, corresponding to the maximum of the correlation function, also called correlation peak, of all the possible trend paths of the frequency of the signal between the instants $t_0$ and $t_n$, the total energy of each possible trend path being obtained by coherently aggregating correlation results between the initial $t_0$ and final $t_n$ instants, the frequency taking in succession all the frequency values located on the chosen trend path,
in selecting the trend path whose total energy is the strongest,
in choosing in succession all the other possible initial frequency assumptions and, for each initial frequency assumption, in selecting the trend path of the frequency of the signal whose total energy is the strongest,
in deciding that, out of all the paths selected on each frequency assumption, the path which has the strongest energy is the most likely path and corresponds to the real path followed by the receiver.

Advantageously, the total energy of each possible trend path of the frequency of the signal is obtained by coherently aggregating the correlation results between the initial instant $t_0$ and final instant $t_n$, the frequency successively taking all the frequency values located on the chosen path.

Preferably, for each initial frequency assumption, the possible trend paths of the frequency of the signal are determined by taking into account information delivered by at least one inertial sensor located in the receiver.

Advantageously, the information delivered by the inertial sensor is taken into account in an error envelope established on the basis of the characteristics of the sensor.

Optionally, when the variation of the information delivered by the sensor, between two measurement instants, is below a predetermined variation threshold, it is decided that the receiver has not moved between the two measurement instants and a frequency that is stable during integration is then assumed.

BRIEF DESCRIPTION OF THE DRAWINGS

Other features and advantages of the invention will become clearly apparent hereinafter in the description given as a purely illustrative and nonlimiting example, with reference to the appended schematic drawings which represent.

DETAILED DESCRIPTION

Figure 1:
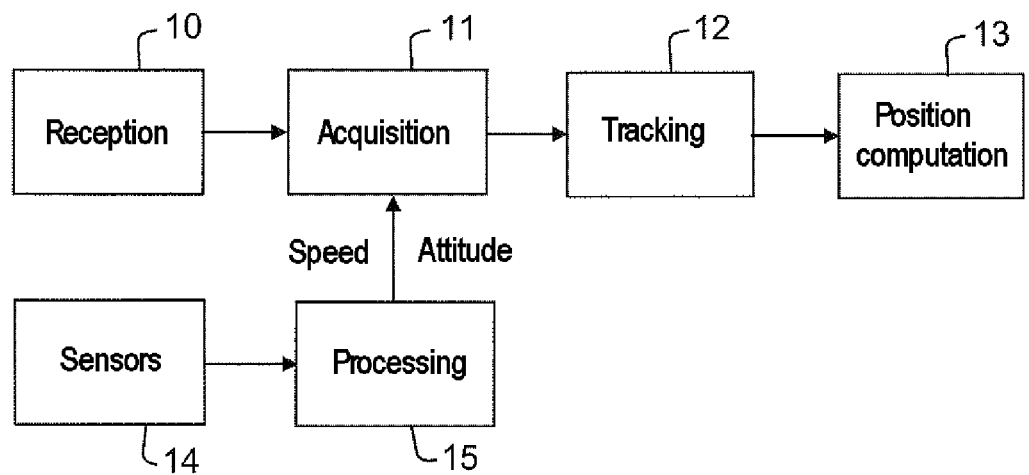
FIG. 1: an exemplary architecture of a receiver of a global satellite navigation system, according to the invention.

The architecture represented in FIG. 1 comprises means 10 for receiving radiofrequency signals transmitted by a satellite, means 11 for acquiring received signals to determine the pseudo-random spreading codes which modulate the signals originating from the satellite, means 12 for tracking signals making it possible to compensate for the dynamics of the receiver, means 13 for computing the position of the receiver. Furthermore, the architecture comprises inertial sensors 14 for delivering, after processing by processing means 15, information relating to the speed and the attitude of the receiver relative to the satellite.

Figure 2:
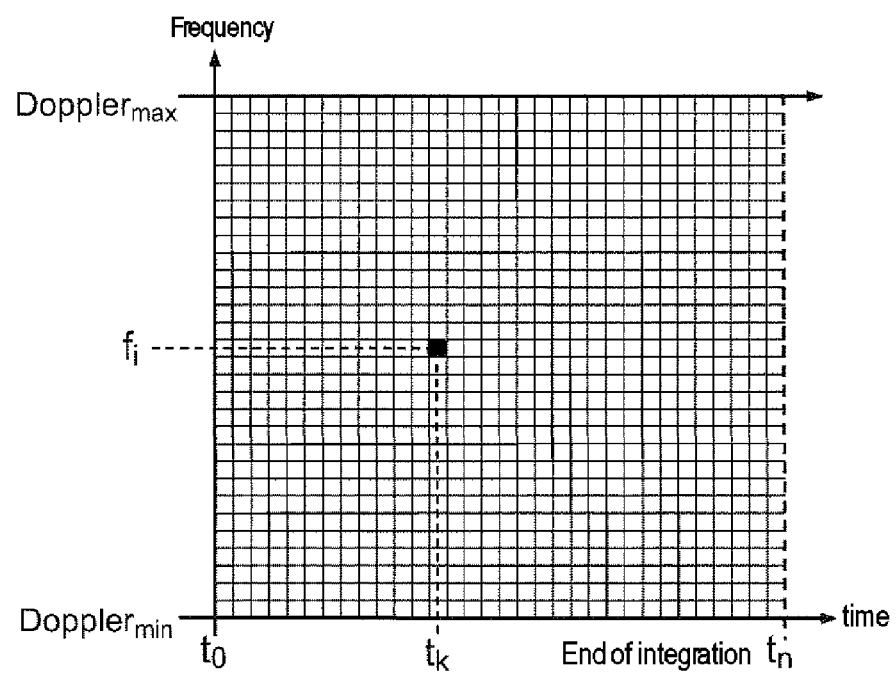
FIG. 2: an exemplary frequency-time graph illustrating the frequency assumptions to be explored during an acquisition over a given integration time.

The graph of FIG. 2 has a vertical axis corresponding to the frequency assumptions to be explored and a horizontal axis corresponding to the integration time. The frequency assumptions to be explored lie between a minimum frequency associated with a minimum Doppler effect and a maximum frequency associated with a maximum Doppler effect. The time axis and the frequency axis are respectively subdivided into basic time durations and into basic frequency bands and each frequency-time pair corresponds to a particular cell of the mesh of FIG. 2.

Each frequency assumption has a corresponding receiver-satellites relative position and a receiver clock offset that are possible at a given instant. Between two given instants $t_0$ and $t_n$, the position of the receiver can change along a plurality of possible paths. To know the position of the receiver at each instant, the invention therefore consists in exploring each possible path and in computing the energy of the signal for each of these paths. The path that has the strongest energy is the path followed by the receiver. At each given frequency $f_i$ and at a given instant $t_k$ corresponding to an individual cell of the graph of FIG. 2, the energy of the signal is computed. For this, the receiver correlates the received signal with a replica of the pseudo-random code of the satellite that has sent the signal. The pseudo-random code of the satellite is known and does not change throughout the life of the satellite. The result of the correlation at the frequency $f_i$ and at the instant $t_k$ is expressed:

$$s(f_i, t_k, \tau) = \int_{kT}^{(k+1)T} r(t) \cdot c\left((t - kT - \tau)\frac{f_i}{f_c} R_c\right) \cdot e^{-2j\pi f_i t} dt$$

In which r(t) is the signal received by the receiver, c(t) is the spreading code used in the modulation of the received signal, T is the coherent integration time which usually corresponds to a period of the spreading code c(t), $\tau$ is the estimated offset between the received spreading code and the transmitted spreading code, fc is the frequency of the carrier (typically 1575.42 MHz for GPS L1C/A), Rc is the chip rate of the spreading code (typically 1.023M chips/s for GPS L1C/A).

For example, in the case of a GPS C/A signal, T is typically equal to 1 ms. However, T could have any other value.

Figure 3:
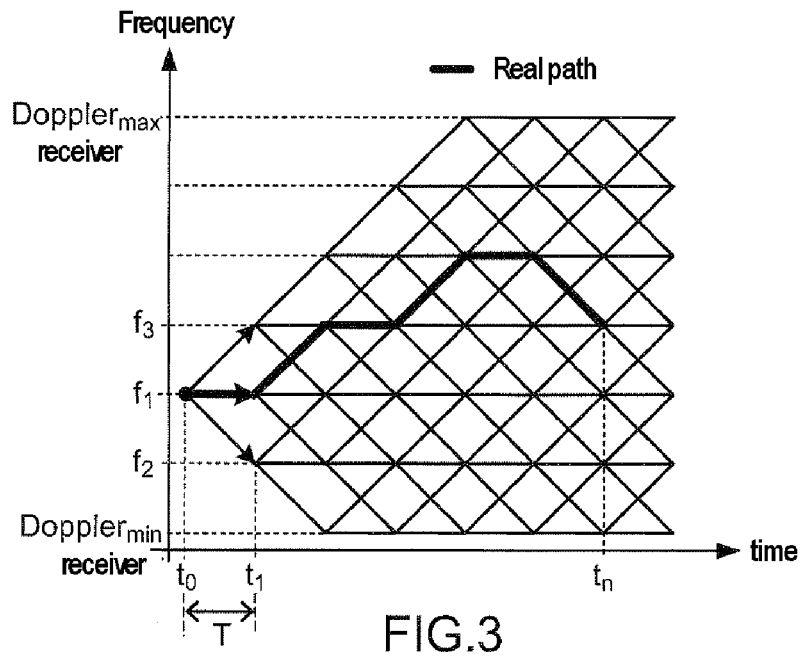
FIG. 3: an example of the possible paths to be explored for a given initial frequency assumption $f_1$, according to the invention.

When all the basic correlations corresponding to each frequency assumption have been carried out, the method according to the invention consists in choosing a first initial frequency assumption $f_1$ corresponding to an initial instant $t_0$, then in choosing a particular trend path for the frequency of the signal between $t_0$ and $t_n$ out of all the possible paths and in determining the total energy of the signal corresponding to this path by aggregating each item $s(f_i, t_k, \tau,)$ constituting the path. $t_0$ corresponds to the final instant of the search. FIG. 3 illustrates all the possible paths based on an initial frequency assumption $f_1$ at an instant $t_0$ to the instant $t_n$. The total energy corresponding to a chosen path is obtained by coherently aggregating the correlation results $s(f_1, t_k, \tau)$, $t_k$ successively taking all the values between $t_0$ and $t_0$ and $f_1$ successively taking all the frequency values located on the selected path. For example, at the instant $t_1$, the value of the frequency may have changed to the value $f_2$ or $f_3$, or have remained unchanged.

From the same frequency assumption, all the possible paths are then selected in succession, one after the other, and their respective energy is computed in a similar way. Out of all the possible paths, there is only one single path that allows for a non-destructive recombination of the correlation results, illustrated by a thick line 3 in FIG. 3. This path depends, among other things, on the relative dynamics between the satellite and the receiver. This path therefore has a corresponding maximum signal energy. The method according to the invention then consists, for each initial frequency assumption, in selecting the path whose total energy is the strongest and in deciding that, out of all the paths selected at each frequency assumption, the path which has the strongest energy is the most likely path and corresponds to the real path followed by the receiver.

This method, which requires all the possible paths for each initial frequency assumption to be explored, is very cumbersome and very lengthy in terms of processing time. Advantageously, to reduce the number of paths to be explored for each initial frequency assumption, between the initial and final instants, the method comprises an intermediate step consisting in using at least one inertial sensor, for example of MEMS (Micro-Electro-Mechanical System) type. The inertial sensor is placed, for example, on the receiver and delivers information relating to the position of the receiver such as, for example, the acceleration and/or the angular position of the receiver, and/or the heading relative to magnetic north, these information items being delivered for all three directions in space. For this, the inertial sensor may include a tri-axial accelerometer and/or tri-axial gyroscope and/or a tri-axial magnetometer. The information delivered by the initial sensor is then processed by the processing means to obtain the attitude and/or the position and/or the speed of the receiver. These data are then transmitted to the acquisition means in order, during the acquisition phase, to take account of the successive positions of the receiver given by the inertial sensor and thus limit the assumptions concerning the frequency trends over time and therefore the processing time during the acquisition phase. In practice, a frequency assumption corresponds to an assumption concerning the Doppler effect and the Doppler effect is proportional to the relative speed between the user and the satellite. Consequently, the information given by the inertial sensor is information relating to the trend of the Doppler effect during the acquisition. This information makes it possible to limit the possibilities of possible recombinations between the initial and final instants.

Figure 4:
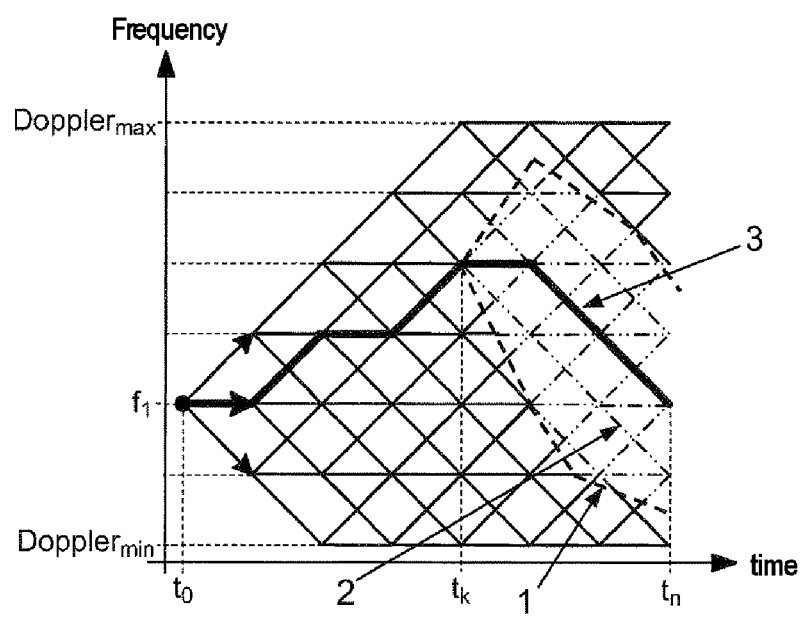
FIG. 4: an example of the possible paths for a given initial frequency assumption $f_1$, taking into account the information delivered by an inertial sensor, according to the invention.

FIG. 4 is an example illustrating the possible paths for a given initial frequency assumption $f_1$, by taking into account the information delivered by the inertial sensor. The real path 3 corresponding to the maximum energy of the signal is represented by a thick line, the paths 2 to be explored because of the uncertainty concerning the information deriving from the inertial sensor are represented within the error envelope 1 by dotted lines. In practice, the information delivered by an inertial sensor exhibits an error margin which increases, notably, with the operating time of the sensor and the temperature. Since the characteristics of the sensors are given by the manufacturer, after processing, the error margin concerning the information delivered by the sensor can be converted into frequency and an error envelope of the frequency corresponding to a given sensor can be determined easily from these characteristics.

Thus, as FIG. 4 shows, the method then consists, when all the basic correlations corresponding to each frequency assumption have been carried out, in selecting an initial frequency assumption $f_1$ corresponding to an initial instant $t_0$, in following the path extracted from the information given by the sensor up to an instant $t_k$ corresponding to the moment when the data delivered by the sensor begin to exhibit an error margin, then between the instant $t_k$ and the final instant $t_n$, in selecting a path out of all the possible paths included within the frequency error envelope established previously.

Advantageously, the method may also include an option consisting in carrying out a discrimination of the information given by the sensor when the latter indicates that the receiver has not moved. The discrimination is carried out by introducing a movement threshold below which it is decided to follow the information indicated by the sensor. Thus, in the case where the sensor indicates that, between two consecutive measurement instants, the receiver has moved by a distance less than the movement threshold, the method considers that the receiver, and therefore the frequency, has not moved during these two measurements.

The method presents the advantages of making it possible to detect all the energy of the received signal throughout the integration time without penalizing the processing time and therefore the response time of the receiver. Furthermore, the receiver gains in sensitivity in its capacity to detect low energies because the method makes it possible to take into account a larger number of frequency-time assumptions.

Although the invention has been described in relation to a particular embodiment, it is obvious that it is in no way limited thereto and that it includes all the technical equivalents of the means described as well as their combinations provided that the latter fall within the context of the invention.

The invention claimed is:

1. A method for optimizing an acquisition of a spread-spectrum signal originating from a satellite by a mobile receiver, said method comprising:
   receiving a signal transmitted by at least one transmitter, the signal being modulated by a pseudo-random code;
   generating a local replica of the pseudo-random code of the signal transmitted;
   determining a plurality of assumptions relating to a frequency $f_i$ of the signal received at an initial instant $t_0$ and to a trend of the frequency $f_i$ over time up to a final instant $t_n$ corresponding to an integration time, each assumption in the plurality of assumptions relating to the trend of the frequency $f_i$ of the signal between the initial instant $t_0$ and the final instant $t_n$ being a trend path;
   calculating a plurality of correlation functions $s(f_i, t_k, \tau)$ of all pairs of frequency-time assumptions $(f_i, t_k)$ using at least the local replica;

choosing a first initial frequency assumption $f_1$ out of the plurality off assumptions relating to the frequency $f_i$ corresponding to the initial instant $t_0$;

acquiring at least one information item concerning the movement of the receiver, and deducing therefrom, for the first initial frequency assumption $f_1$, the trend assumptions for a frequency of the signal over time;

determining a respective total energy, corresponding to a maximum of the correlation function, as a correlation peak, of all the possible trend paths of the frequency of the signal between the instants $t_0$ and $t_n$, the total energy of each possible trend path being obtained by coherently aggregating correlation results between the initial $t_0$ and final $t_n$ instants, the frequency taking in succession all the frequency values located on the chosen trend path;

selecting the trend path whose total energy is the strongest;

choosing in succession all the other remaining possible initial frequency assumptions in the plurality of assumptions relating to the frequency $f_i$ and, for each remaining initial frequency assumption, selecting the trend path whose total energy is the strongest; and deciding that, out of all the trend paths selected on each frequency assumption in the plurality of assumptions relating to the frequency $f_i$, the trend path which has the strongest energy is the most likely path and substantially corresponds to a real path followed by the receiver.

2. The method as claimed in claim 1, wherein the total energy of each possible trend path of the frequency of the signal is obtained by coherently aggregating the correlation results between the initial instant $t_0$ and final instant $t_n$, the frequency successively taking all the frequency values located on the chosen path.

3. The method as claimed in claim 1, wherein, for each initial frequency assumption, the possible trend paths of the frequency of the signal are determined by taking into account information delivered by at least one inertial sensor located in the receiver.

4. The method as claimed in claim 3, wherein the information delivered by the inertial sensor is taken into account in an error envelope established on the basis of the characteristics of the sensor.

5. The method as claimed in claim 4, wherein, when the variation of the information delivered by the sensor, between two measurement instants, is below a predetermined variation threshold, it is decided that the receiver has not moved between the two measurement instants and a frequency that is stable during integration is then assumed.

6. A method for optimizing an acquisition of a spread-spectrum signal originating from a satellite by a mobile receiver, said method comprising:

receiving a signal transmitted by at least one transmitter, the signal being modulated by a pseudo-random code;

generating a local replica of the pseudo-random code of the signal transmitted;

determining a plurality of assumptions relating to frequency $f_i$ of the signal received at an initial instant $t_0$ and to a trend of the frequency $f_i$ over time up to a final instant $t_n$ corresponding to an integration time, each assumption in the plurality of assumptions relating to the trend of the frequency $f_i$ of the signal between the initial instant $t_0$ and the final instant $t_n$ being a trend path;

calculating a plurality of correlation functions $s(f_i, t_k, \tau)$ of all pairs of frequency-time assumptions $(f_i, t_k)$ using at least the local replica;

choosing a first initial frequency assumption $f_1$ out of the plurality of assumptions relating to the frequency $f_i$ corresponding to the initial instant $t_0$;

acquiring at least one information item concerning the movement of the receiver, and deducing therefrom, for the first initial frequency assumption $f_1$, the trend assumptions for a frequency of the signal over time;

determining a respective total energy, corresponding to a maximum of the correlation function, as a correlation peak, of all the possible trend paths of the frequency of the signal between the instants $t_0$ and $t_n$, the total energy of each possible trend path being obtained by coherently aggregating correlation results between the initial $t_0$ and final $t_n$ instants, the frequency taking in succession all the frequent values located on the chosen trend path;

selecting the trend path whose total energy is the strongest;

choosing in succession all the remaining possible initial frequency assumptions in the plurality of assumptions relating to the frequency $f_i$ and, for each remaining initial frequency assumption, selecting the trend path whose total energy is the strongest; and deciding that, out of all the trend paths selected on each frequency assumption in the plurality of assumptions relating to the frequency $f_i$, the trend path which has the strongest energy is the most likely path and substantially corresponds to a real path followed by the receiver, wherein, for each initial frequency assumption, the possible trend paths of the frequency of the signal are determined by taking into account information delivered by at least one inertial sensor located in the receiver.

* * * * *

UNITED STATES PATENT AND TRADEMARK OFFICE
CERTIFICATE OF CORRECTION

PATENT NO. : 8,472,504 B2
APPLICATION NO. : 13/121066
DATED : June 25, 2013
INVENTOR(S) : Kubrak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 204 days.

Signed and Sealed this
Eighth Day of September, 2015

Michelle K. Lee
*Director of the United States Patent and Trademark Office*